ELECTROCHEMICAL ANALOG RANDOM ACCESS MEMORY

INVENTOR.
JOHN P. CHOISSER
BY Wade Koontz
ATTORNEY
and
Herbert E. Farmer
AGENT

ELECTROCHEMICAL ANALOG RANDOM ACCESS MEMORY

Original Filed July 1, 1964 2 Sheets-Sheet 2

INVENTOR.
JOHN P. CHOISSER
BY Wade Koontz
ATTORNEY
and
Herbert E Turner
AGENT

United States Patent Office 3,509,544

Patented Apr. 28, 1970

3,509,544

ELECTROCHEMICAL ANALOG RANDOM ACCESS MEMORY

John P. Choisser, San Diego, Calif., assignor to the United States of America as represented by the Secretary of the Air Force Continuation of application Ser. No. 379,769, July 1, 1964. This application Sept. 23, 1968, Ser. No. 764,030

Int. Cl. G11c *13/02, 11/54*

U.S. Cl. 340—173 2 Claims

ABSTRACT OF THE DISCLOSURE

An apparatus providing a random access addressable analog memory, utilizing a chemical neuron to provide a computer memory cell for storing and retrieving analog voltages in a random-access fashion by selectively energizing the desired location.

This application is a continuation of Ser. No. 379,769, filed July 1, 1964, and now abandoned.

The invention described herein may be manufactured and used by or for the United States Government for governmental purposes without the payment of any royalty thereon.

This invention relates to method and apparatus for storing in random-access fashion many electrical potentials, such as the discrete voltage outputs of a multiplicity of integration circuits embodied in an analog computer.

In analog computers as heretofore known and used, the information (single analog voltages) that is presented to the memory device is usually stored in electronic integrators or motor-driven potentiometers, which are large both in size and cost, thus making a large array of such storage cells impractical.

The present invention utilizes a chemical neuron which, in the disclosed method and apparatus can perform this storage function at less than 1/100 the cost, with a size reduction of the same order of magnitude.

Accordingly, it is a principal object of this invention to provide a novel computer memory device for storing analog voltages of any value within operating limits in a random-access fashion.

Still another object of this invention is to provide a novel computer memory device for obtaining stored voltages from any location within the device at an external point or points upon command in a random-access fashion.

And still another object of this invention is to provide a novel computer memory device for storing voltages obtained from some external point in any desired and selected location within said device in a random-access fashion.

Figure 1A:
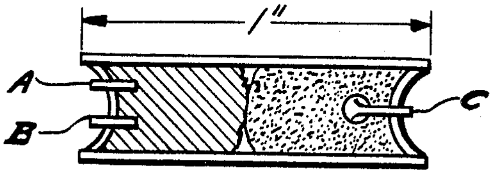
Figure 1B:
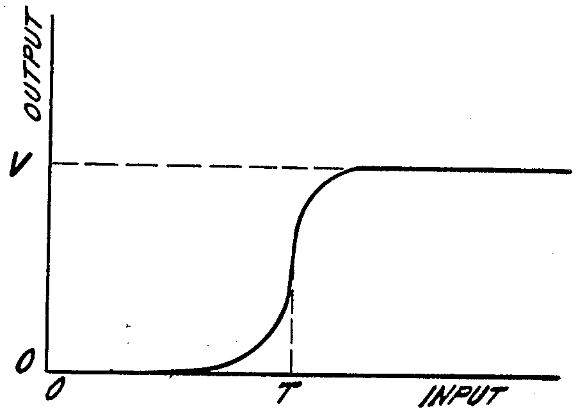

The subject matter of this invention is particularly pointed out and distinctly claimed in the concluding portion of this specification. The invention however, both as to organization and method of operation, together with further objects and advantages thereof, may best be understood by reference to the following description in connection with the accompanying drawings in which:

FIGURE 1*a* is a transverse view of a chemically developed memory cell (neuron);

FIGURE 1*b* is an explanatory diagram; and

Figure 2:
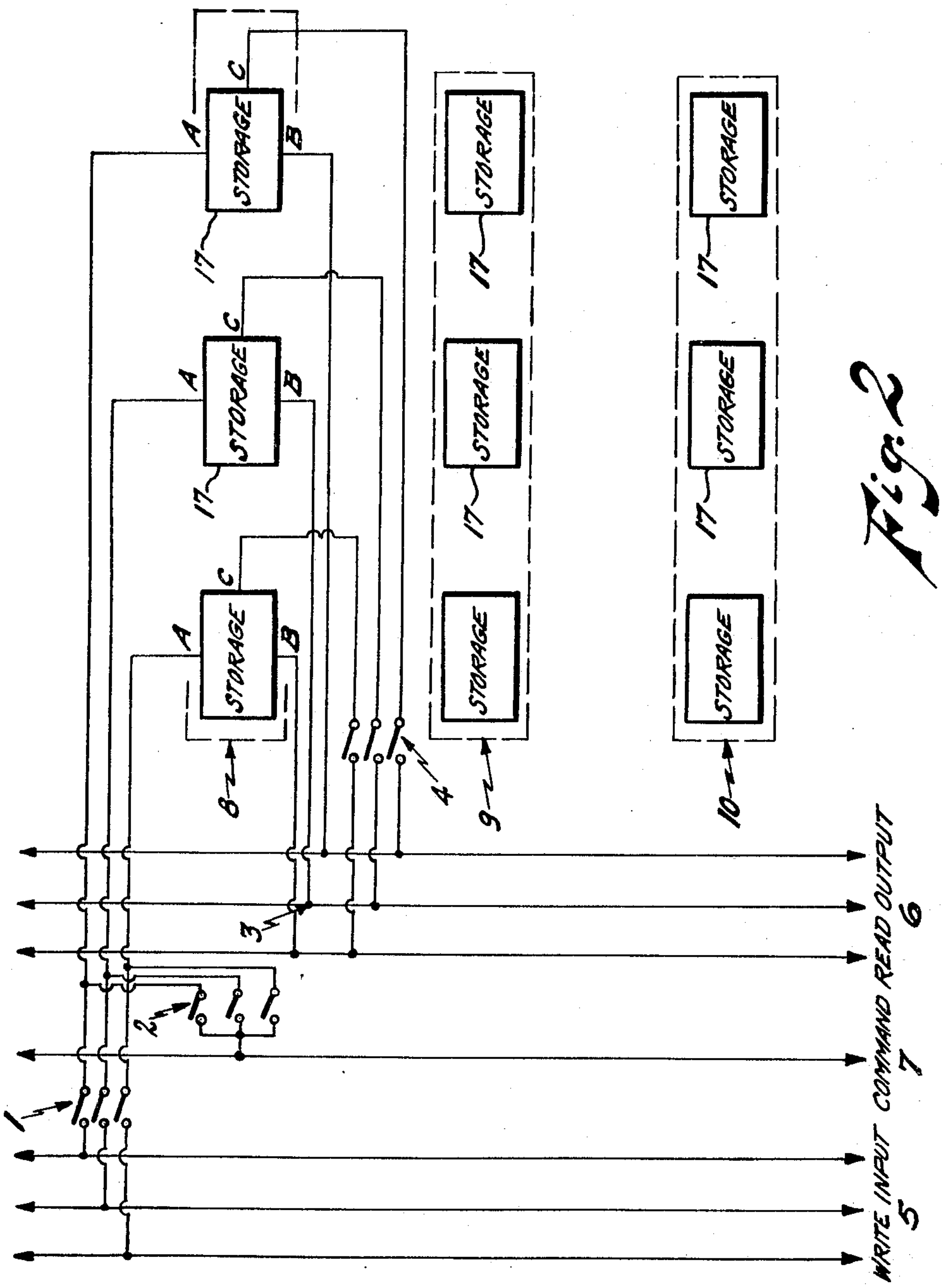

FIGURE 2 shows circuitry for random-access memory operations performable by use of the technique herein disclosed.

Before a description of the memory is attempted, the chemical integrator will be described, as an understanding of the operating characteristics of the cell is a prerequisite to the memory design.

A cross section of the memory cell (chemical neuron) is shown in FIGURE 1*a*, and its transfer function is shown in FIGURE 1*b*.

Verbally, FIGURE 1*b*, with reference to FIGURE 1*a*, says that if the input voltage (on wire A) exceeds a certain threshold voltage T, then an output of V volts will appear at the output terminal B. The output voltage V is variable, and can be preset through the use of terminal C. V can be changed by a current flow between C and A or C and B. This current changes the chemical composition of the cell, and because this chemical change is reversible, the direction of current flow will determine either an increase or decrease in V. Once a value of V has been established, power is removed from terminal C and the cell will remain in its set state. It can be seen, then, that this chemical neuron is capable of storing analog voltages. In reality, it is the *conductance* of the cell that is changed, but this is easily converted to a proportional voltage, and to simplify the discussion the output will be considered in terms of voltage.

One embodiment for an addressable random-access analog memory would be to divide the memory into $m$ "blocks" (analogous to "words" in a digital memory) with $n$ cells per block. This provides a memory capable of storing a total of $m, x, n$ analog voltages. Each of the $m$ blocks has its own address, and during read-out all $n$ cells in the addressed block would be connected to $n$ readout (output) lines, thus making the stored voltages in that block location available at the memory output terminals.

Apparatus for achieving this random-access analog memory operation is shown in block diagram form in FIGURE 2. In this memory, $m=3$ (blocks 8, 9, 10) and $n=3$ (storage cells, 17, per block). Connections are shown only to cells 17 in block 8 for purposes of clarity. Each of storage cells 17 has the transfer characteristic shown in FIGURE 16. Each block 8, 9, 10 has a set of switches corresponding to switches 1, 2 and 4, together with the fixed contact points shown as 3. All switches are normally open.

To read the outputs from cells 17 for each selected block, switches 2 are closed thus providing a voltage input, A, to each cell from 7. This voltage at 7 must be greater than the threshold voltage T. (FIGURE 1*b*). The various outputs then appear at the outputs, B, of the cells and are transmitted through contact points 3 to memory output 6. At the end of the read cycle, switches 2 open, and the outputs disappear.

In order to write information into the memory (i.e. storing a new voltage in cells 17), a block is first selected by conventional addressing methods. The information to be stored is applied to input 5, and then switches 1 and 4 close at the chosen block. This applies the *desired* output voltage to inputs, A, of the cells through switches 1. Simultaneously, the *actual* output voltage from B is applied to control point C through contact points 3 and switch 4.

If the *actual* output of a cell, 17, is different from the *desired* output, there will be a potential difference between points C and A which will cause a current to flow. This current will change the output level (FIGURE 1*b*) until there is a potential difference of zero between points C and A. When this occurs, the current ceases to flow, and the "write" operation is ready to be terminated. After a sufficient time has elapsed to be certain that all cells have reached their desired value, the write cycle is terminated by opening switches 1 and 4.

While a specific embodiment of my invention has been shown and described, it will, of course, be understood that various modifications may be made without departing from my invention in its broader aspects.

For example, the write process can be externally viewed or controlled by electrically monitoring memory output 6. It is also apparent that the instant invention has many applications. For example, the random-access addressable analog memory would be extremely useful in increasing the apparent problem-solving capability of analog computers. As problems become increasingly complex, attempts are being made to use basic computing elements in the computers for different purposes at different points in the problem solution. This type of computer, though highly desirable, is extremely difficult to use, because potentiometer settings, initial conditions for the integrators, and solutions from prior portions of the problems must be available for re-use in later portions of the problem. A random-access analog memory would fill the storage requirement, thus enabling large, complex problems to be divided into more manageable portions. Initial conditions, prior solutions, and potentiometer settings could all be read out of the memory almost instantaneously on command, causing a smooth problem flow and much faster solution times.

Therefore, it is intended that the appended claims cover all such changes and modifications as fall within the true spirit and scope of my invention.

I claim:

1. Computer memory apparatus for storing analog voltages in a random-access fashion by selectively energizing the desired location comprising: a plurality of chemical storage cells arranged to form blocks of cells, a predetermined number of said cells constituting a block, each of said cells having an input, an output and a control terminal, means for selecting a desired block of cells, a first set of switching means for applying the information to be stored to each storage cell input in said block, a second set of switching means for simultaneously applying each output voltage from each of said cells to its corresponding cell control terminal, said storage operation terminating when there is a potential difference of zero between said storage cell output and said storage cell control terminal.

2. Computer memory apparatus for storing and obtaining analog voltages in a random-access fashion by selectively energizing the desired location comprising: a plurality of chemical storage cells, each of said cells having a threshold voltage, each of said cells having an input, an output and a control terminal, means of applying a command signal to the input of each of said cells for storage within said cells, the voltage of said command signal being greater than the threshold voltage of each of said cells, means for varying the conductance of said storage cell and means for causing the stored voltages to be transmitted out of said storage cells.

References Cited

UNITED STATES PATENTS

| | | | |
|---|---|---|---|
| 3,172,083 | 3/1965 | Constantine | 340—173 |
| 3,211,968 | 10/1965 | Grams | 340—173 |
| 3,305,847 | 2/1967 | Clapper | 340—173 |
| 3,017,612 | 1/1962 | Singer | 340—173 |
| 3,331,062 | 7/1967 | Wisdom | 340—173 |
| 3,354,439 | 11/1967 | Mitchell | 340—173 |

TERRELL W. FEARS, Primary Examiner

U.S. Cl. X.R.

324—94